United States Patent Office 3,124,553
Patented Mar. 10, 1964

3,124,553
HIGH TEMPERATURE THICKENERS FOR POLYMERIC MATERIALS
Howard P. Cordts, Bay City, Mich., assignor to The Dow Chemical Company, Midland, Mich., a corporation of Delaware
No Drawing. Filed June 10, 1960, Ser. No. 35,121
5 Claims. (Cl. 260—45.5)

This invention concerns a composition of a halomethyldiphenyl oxide, hereafter HMDPO, thickened with a fine particle size, high molecular weight, polymeric vinylaryl hydrocarbon lightly crosslinked with a crosslinking agent of the group consisting of divinylbenzene, divinylnaphthalene, divinyltoluenes, divinylxylenes, diacrylate esters, dimethacrylate esters and diallyl esters. More particularly, it concerns HMDPO compositions which have increased viscosities at heat-polymerizing temperatures of about 90° C. and above.

HMDPO's, halo being chloro or bromo, having from 1 to 4 halomethyl groups per diphenyl oxide unit and mixtures thereof are well-known monomers; Chemical and Engineering News, April 18, 1960, page 108. When heated at elevated temperatures, advantageously with a Friedel-Crafts catalyst, such as ferric chloride, aluminum chloride or zinc chloride, and at temperatures from about 90° to 400° C. and preferably between 100° and 150° C., the HMDPO's give off hydrogen halide and polymerize to give a cured, heat-resistant polymer which is solid when the monomer has up to one halomethyl group per molecule on a statistical basis and which is foamed when the monomer has more than one halomethyl group per molecule on a statistical basis.

A disadvantage noted in making flame-resistant compositions from HMDPO's and inorganic fillers, e.g., fibrous glass, particularly when the polymer is to be formed or coated on a vertical or slanted surface, is that the material runs off before polymerization is complete. Some conventional thickeners were not useful in attempting to solve this problem, either because they could not withstand elevated temperatures or the evolved hydrogen halide, or because they affected the cure of the resin or the foaming action of the higher halomethylated diphenyl oxides. Inorganic thickeners, such as bentonite, had too great a thickening effect for general use and especially for spray applications. The same was true with usual polystyrenes. Highly crosslinked polystyrenes are insoluble in the halomethyldiphenyl oxides.

It has now been discovered that certain fine particle size, lightly crosslinked, high molecular weight, resinous polymeric vinylaryl hydrocarbons are useful in thickening HMDPO's so that the run-off problem has been solved. These polymers, hereinafter called microgels, contain about 0.04 to about 1.1 mole percent of a combined crosslinking agent having two vinylidene groups of the group consisting of divinylbenzene, divinylnaphthalene, divinyltoluenes, divinylxylenes, diacrylate esters, dimethacrylate esters, and diallyl esters, the balance being one or more combined vinylaryl hydrocarbons, e.g., styrene and lower alkyl styrenes, including α-methyl styrene, having up to 4-carbon alkyl substituents. They have an average particle diameter of about 0.05–0.1 micron (400–1250 A.) as determined by electron micrography, and a molecular weight of about 100–200 million, based on particle mass, as calculated from the electron micrograph diameter, the density and the assumption (supported by viscosity behavior) that there is one molecule per particle in the presence of crosslinking agent.

The styrene microgels used in the compositions of this invention can be prepared in aqueous dispersion by the method of Shashoua et al., Journal of Polymer Science XXXIII, pages 101 et seq. (1958). To obtain these microgels in dry, organic-dispersible form, they are vacuum dried up to 100° C. and cooled to room temperature before being exposed to air.

The compositions of this invention are prepared by dispersing from about 0.25 to 5 weight percent, HMDPO basis, of a dry styrene microgel as thickener in an HMPDO. The dispersion, which is visually continuous like a solution, can be carried out in usual ways, such as by stirring or shaking in a mechanical shaker.

HMPDO's useful in the practice of this invention include mono(chloromethyl)diphenyl oxide, di(chloromethyl)diphenyl oxide, tri(chloromethyl)diphenyl oxide, tetra(chloromethyl(diphenyl oxide, their bromo analogs and the analogous ditolyl oxide compounds and mixtures thereof. It is not necessary that the HMDPO's be separated or purified. On the contrary, commercial HMDPO's containing one or more of the above compounds with up to 50 weight percent of unreacted diphenyl oxide are commercially attractive. The halomethyl substituents are ortho and para oriented with respect to the ether linkage, and up to 2 of such substituents may be on one benzene ring.

The Friedel-Crafts catalyst used in the preparation of HMDPO's in the amount of ca. 0.1–1 weight percent, HMDPO basis, is advantageously left in the commercial HMPDO's, since it promotes condensation polymerization (curing) with evolution of hydrogen bromide or hydrogen chloride. Actually, no catalyst is necessary for the condensation reaction and direct thermal condensation may be employed. When the catalyst is removed from the HMDPO's, a cure temperature of 200° to 400° C. is required. When the catalyst used for making the HMDPO's is not removed, a cure temperature of 100° to 200° C. is advantageously used. If additional catalyst up to 2 weight percent is added, HMDPO basis, a cure temperature of 90° to 100° C. is advantageously used. The halomethylation reaction in the preparation of HMDPO's, as pointed out in Chemical and Engineering News, April 18, 1960, page 108, gives rise to ortho and para substitution.

The following non-limitative examples describe completely specific embodiments of the inventive process and products claimed an set forth the best mode contemplated by the inventor of carrying out his invention.

EXAMPLE 1

A 4-inch by 6-inch Pyrex glass plate was heated by direct contact with a hot plate to a temperature of 230° F. The glass plate was marked off in inch squares and the set-up was tilted at approximately 30° to the horizontal. The temperature was measured by a thermocouple and potentiometer which gave direct temperature readings. A thermocouple junction was in direct contact with the glass plate at the air-exposed surface and the junction was insulated from the air by a sheet of asbestos. The glass plate was chosen to simulate the surface characteristics of glass fiber.

Two drops of a commercial chloromethylated diphenyl oxide (ca. 60 weight percent di(chloromethyl)diphenyl oxide and ca. 40 percent mono(chloromethyl)diphenyl oxide with less than one percent of each of tri- and tetra-(chloromethyl)diphenyl oxide containing one weight percent zinc chloride, HMDPO basis) was placed on a line and the distance of run down the heated pyrex glass plate before cure was measured and compared with a series of chloromethylated diphenyl oxide compositions containing various thickeners of the invention and prepared by adding thickener to 40 grams of chloromethylated diphenyl oxide. The styrene microgel thickeners were stirred and shaken with the chloromethylated diphenyl oxide until they dispersed. The identity of the thickeners and test data follow in Table I.

Table I
EFFECT OF MICROGEL THICKENERS ON REDUCTION OF FLOW OF CMDPO ON A GLASS PLATE

| Thickners—Microgels | Percent DVB | Conc. in CMDPO, percent by Weight | Average Run, Inches |
|---|---|---|---|
| Blank | | | 3.75 |
| Styrene microgel | 0.125 | 1 | 2 |
| | 0.125 | 2 | 1.50-1.75 |
| Vinyltoluene microgel | 0.1 | 2 | 2 |
| | 0.5 | 2 | 2 |
| Vinyltoluene-tybrene microgel (50:50) | 0.06 | 2 | 1.50 |

Conc.=concentration.
DVB=divinylbenzene.
CMDPO=chloromethyldiphenyl oxide.
Tybrene=p-tertiary butyl styrene.

EXAMPLE 2

The procedure of Example 1 was repeated with a representative styrene microgel to determine the effect of temperature variation. Test data follow in Table II.

Table II
REDUCTION IN FLOW AT DIFFERENT TEMPERATURES

| Thickener | Conc. in CMDPO, percent by Weight | Run in Inches at Different Temperatures | | |
|---|---|---|---|---|
| | | 230° F. | 257° F. | 302° F. |
| Blank | | 3.75 | 3.15 | 2.25 |
| Polystyrene microgel, 0.1% DVB | 2 | 2.00 | 1.75 | 1.00 |

EXAMPLE 3

Larger batches of the series of thickened chloromethyldiphenyl oxide compositions described in Example 1 were used to spray coat both sides of commercial glass wool mats (9-inch by 9-inch by about ⅔-inch) while they were suspended in a vertical position. For this purpose a commercial paint sprayer was used. A loading of about 50 weight percent chloromethyldiphenyl oxide, glass wool basis, was applied. Assemblies of four of such squares were compressed to one-inch thickness between heavy mesh screening and wired together. The assemblies were cured in a forced draft oven maintained at about 400° F. to give a foamed resinous binder. All of the assemblies were satisfactory for high temperature insulation except a blank prepared from unthickened chloromethyldiphenyl oxide. Run-off of the sprayed chloromethyldiphenyl oxide blank made it impossible to get a uniformly coated product.

What is claimed is:

1. A composition of ar-halomethyldiphenyl oxide thickened with from about 0.25 to 5 weight percent, halomethylphenyl oxide basis, of a microgel of the group consisting of a resinous copolymer of (1) a member of the group consisting of styrene, alkyl substituted styrenes and mixtures thereof with (2) between about 0.04 and 1.1 mole percent of a crosslinking compound, of the group consisting of divinylbenzene, divinylnaphthalene, divinyltoluene, divinylxylenes, diacrylate esters, dimethacrylate esters and diallyl esters, halo being a member of the group consisting of bromo and chloro, wherein the halomethyl groups are ortho- and para-substituted with respect to the ether linkage and wherein up to 2 halomethyl groups are on one benzene ring.

2. A composition as claimed in claim 1 wherein the ar-halomethyldiphenyl oxide is a commercial mixture of mono, di-, tri-, and tetra-(chloromethyl)diphenyl oxides wherein the halomethyl groups are ortho- and para-substituted with respect to the ether linkage and wherein up to 2 halomethyl groups are on one benzene ring.

3. A composition as claimed in claim 1 wherein the ar-halomethyldiphenyl oxide is thickened with from .1 to 2 weight percent of said microgel.

4. A composition as claimed in claim 1 wherein the crosslinking compound is divinylbenzene.

5. A composition of chloromethyldiphenyl oxide having a preponderance of di(chloromethyl)diphenyl oxide and mono(chloromethyl)diphenyl oxide, the balance being tri- and tetra-(chloromethyl)diphenyl oxides containing about one weight percent zinc chloride, chloromethyldiphenyl oxide basis, and from 0.25 to 5 weight percent, chloromethyldiphenyl oxide basis, of a microgel thickener of the group consisting of a resinous copolymer of (1) a member of the group consisting of styrene, alkyl substituted styrenes and mixtures thereof with (2) between about 0.04 and 1.1 mole percent of a crosslinking compound of the group consisting of divinylbenzene, divinylnaphthalene, divinyltoluenes, divinylxylenes, diacrylate esters, dimethacrylate esters and diallyl esters.

No references cited.